(12) United States Patent
Rodick et al.

(10) Patent No.: US 11,876,375 B2
(45) Date of Patent: Jan. 16, 2024

(54) POWER GRID RESTORATION SYSTEM

(71) Applicant: General Electric Company, Schenectady, NY (US)

(72) Inventors: Robert Samuel Rodick, Scotia, NY (US); Mazdak Haeri Foomani, Meisterschwanden (CH)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 2 days.

(21) Appl. No.: 17/753,046

(22) PCT Filed: Aug. 21, 2019

(86) PCT No.: PCT/US2019/047579
§ 371 (c)(1),
(2) Date: Feb. 16, 2022

(87) PCT Pub. No.: WO2021/034326
PCT Pub. Date: Feb. 25, 2021

(65) Prior Publication Data
US 2022/0329076 A1   Oct. 13, 2022

(51) Int. Cl.
*H02J 3/38* (2006.01)
*H02J 3/46* (2006.01)
*H02J 3/32* (2006.01)

(52) U.S. Cl.
CPC ............... *H02J 3/381* (2013.01); *H02J 3/32* (2013.01); *H02J 3/472* (2020.01); *H02J 3/388* (2020.01)

(58) Field of Classification Search
CPC .... H02J 3/32; H02J 3/381; H02J 3/388; H02J 3/472
(Continued)

(56) References Cited

U.S. PATENT DOCUMENTS

| 2004/0245783 A1 | 12/2004 | Gilbreth et al. |
| 2009/0112374 A1 | 4/2009 | Kirchhof et al. |

(Continued)

FOREIGN PATENT DOCUMENTS

| CN | 107528346 A | 12/2017 |
| CN | 109713669 A | 5/2019 |

(Continued)

OTHER PUBLICATIONS

European Extended Search Report of EP Application No. 22156181.4, dated Jul. 22, 2022, 9 pgs.
(Continued)

*Primary Examiner* — Hal Kaplan
(74) *Attorney, Agent, or Firm* — Fletcher Yoder, P.C.

(57) ABSTRACT

A power grid restoration system includes a hybrid power plant that provides electrical power to a power grid. The hybrid power plant includes a power plant that generates electrical power with a power drive. A battery energy storage system, which receives and stores electrical power from the power plant, releases the electrical power during block loading of the power grid. A controller couples to the power plant and to the battery energy storage system. The controller controls charging of the battery energy storage system with the power plant and controls the release of a block load of electrical power from the battery energy storage system and the power plant while block loading the power grid during a black grid restoration.

20 Claims, 5 Drawing Sheets

(58) Field of Classification Search
USPC .......................................................... 307/43
See application file for complete search history.

(56) References Cited

U.S. PATENT DOCUMENTS

| | | | |
|---|---|---|---|
| 2013/0221877 | A1 | 8/2013 | Marken |
| 2018/0145511 | A1* | 5/2018 | Biellmann .............. H02J 3/381 |
| 2018/0248378 | A1 | 8/2018 | Ren |
| 2018/0248379 | A1* | 8/2018 | Schulz .................... H02J 11/00 |

FOREIGN PATENT DOCUMENTS

| | | |
|---|---|---|
| EP | 2645522 A1 | 10/2013 |
| EP | 3952047 A1 | 2/2022 |
| JP | 2005229702 A | 8/2005 |
| JP | 2007006595 A | 1/2007 |
| JP | 2008067514 A | 3/2008 |
| JP | 2016092850 A | 5/2016 |
| WO | 2021034326 A1 | 2/2021 |
| WO | 2021196406 | 10/2021 |

OTHER PUBLICATIONS https://www.ge.com/news/press-releases/hybrid-solutions-ge-completes-first-battery-assisted-black-start-ge-heavy-duty-gas, Feb. 26, 2020, 3 pgs.

PCT International Preliminary Report on Patentability, Application No. PCT/US2019/047579, dated Mar. 3, 2022; 9 pages.

Mr Fuchs, "Battery Energy Storage Solution Enhancing the operational flexibility of flexible combined cycle industrial gas turbines", May 9, 2018 (May 9, 2018), XP002796579, Retrieved from the Internet: URL: http://hybridpowersystems.org/wp-content/uploads/sites/9/2018/05/3A_2_TENE18_008_paper_Fuchs_Uwe.pdf pp. 1-4.

Wemag, "Erfolgreicher Schwarzstart", May 17, 2019 (May 17, 2019), pp. 1-2, XP002796622, Retrieved from the Internet: URL: https://www.stadt-und-werk.de/meldung_31585_Erfolgreicher+Schwarzstart.pdf p. 1-p. 2.

Liu Weijia, et al., "Multi-objective restoration optimisation of power systems with battery energy storage systems", IET Generation, Transmission&Distribution, IET, UK, vol. 10, No. 7, May 5, 2016 (May 5, 2016), pp. 1749-1757, XP006056487, ISSN: 1751-8687, DOI: 10.1049/IET-GTD.2015.0434 p. 1749-p. 1756.

PCT International Search Report and Written Opinion; Application No. PCT/US2019/047579; dated Jan. 20, 2020; 16 pages.

Japanese Office Action for JP Application No. 2022-505511 dated Jun. 23, 2023; 10 pgs.

* cited by examiner

POWER GRID RESTORATION SYSTEM

BACKGROUND

The subject matter disclosed herein relates to power plants.

Power grids carry electrical energy from power plants to various customers. A device that uses electrical energy is referred to as a load. A power plant may also be considered a load when it uses electrical power to start power production that is commonly known as house loads.

Unfortunately, power outages may occur due to faulty equipment, weather, technical issues and accidents. These power outages may vary in scale. In some cases, the power outage may be large and may inhibit a power plant from restarting operation by drawing power from the power grid. In this situation, the power plants may be required to start with local or temporarily available power sources either installed in the same power plant or elsewhere. This kind of restart is commonly referred to as a black start. A black start is the process of starting a power station from power sources other than power grid and of restoring sections of a grid after a partial or complete blackout. Restoring sections of the grid after a blackout involves significant amounts of power, as multiple loads draw power simultaneously. For example, simultaneous energization of a grid section may include industrial, office, and/or household loads. However, dynamically changing power production by a power plant in response to a grid restoration stage may wear equipment, and/or it may trip the power plant (i.e., take it offline) because of excessive power draw beyond capabilities of the power plant.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the subject power grid restoration system. Indeed, the present system may encompass a variety of forms that may be similar to or different from the embodiments set forth below.

In a first embodiment, a power grid restoration system includes a hybrid power plant that provides electrical power to a power grid. The hybrid power plant includes a power plant that generates electrical power with a power drive. A battery energy storage system, which receives and stores electrical power, releases the electrical power during block loading of the power grid. A controller couples to the power plant and to the battery energy storage system. The controller controls charging of the battery energy storage system with the power plant and controls the release of a block load of electrical power from the battery energy storage system and the power plant, while block loading the power grid during black grid restoration.

In a second embodiment, a method of black grid restoration with a hybrid power plant is provided. The method includes the step of starting a power plant. After starting the power plant, the method includes charging a battery energy storage system with electrical power from the power plant. The method includes releasing a block load of electrical power from the power plant and the battery energy storage system to a power grid.

In a third embodiment, a controller couples to a power plant and to a battery energy storage system. The controller controls charging of the battery energy storage system with the power plant and controls the release of a block load of electrical power from the battery energy storage system and the power plant, while block loading a power grid during black grid restoration.

BRIEF DESCRIPTION OF THE DRAWINGS

These and other features, aspects, and advantages of the present power grid restoration system and methods of restoring power during a black grid event will become better understood when the following detailed description is read with reference to the accompanying drawings in which like characters represent like parts throughout the drawings, wherein.

DETAILED DESCRIPTION

One or more specific embodiments of the present power grid restoration system will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present system, the articles "a," "an," "the," and "said" are intended to mean that there are one or more of the elements. The terms "comprising," "including," and "having" are intended to be inclusive and mean that there may be additional elements other than the listed elements.

As explained above, power grids may experience significant outages also called blackouts. Power is restored to the grid after a blackout, in measured steps in order to stabilize the grid as power production increases by one or more power plants. For example, one neighborhood may have power restored, followed by another neighborhood, a factory, a city block, and so on. Restoring power to these various sections of the grid are referred to as load steps because as each section is energized the simultaneous draw of power from the section creates a step change in the load or power use.

For example, the load (i.e., the combined load of various electrical devices) from a first section of the grid may draw 25 MW. As soon as a second section of the grid is energized, the combined power draw may jump from 25 MW to 45 MW or any other value demanded by the grid and sized for the solution capacity.

The embodiments described herein include a hybrid power plant that enables black starting a grid with large load steps. As a result of the large load steps, the grid may be restored more rapidly and without dynamically out-of-normal operation loading the power plant portion of the hybrid power plant. In other words, in response to energizing sections of the grid, the power plant may not rapidly increase power output beyond the normal operational limits. This measured approach reduces stress and lifetime consumption on components of the power plant, such as its gas turbines.

Figure 1:
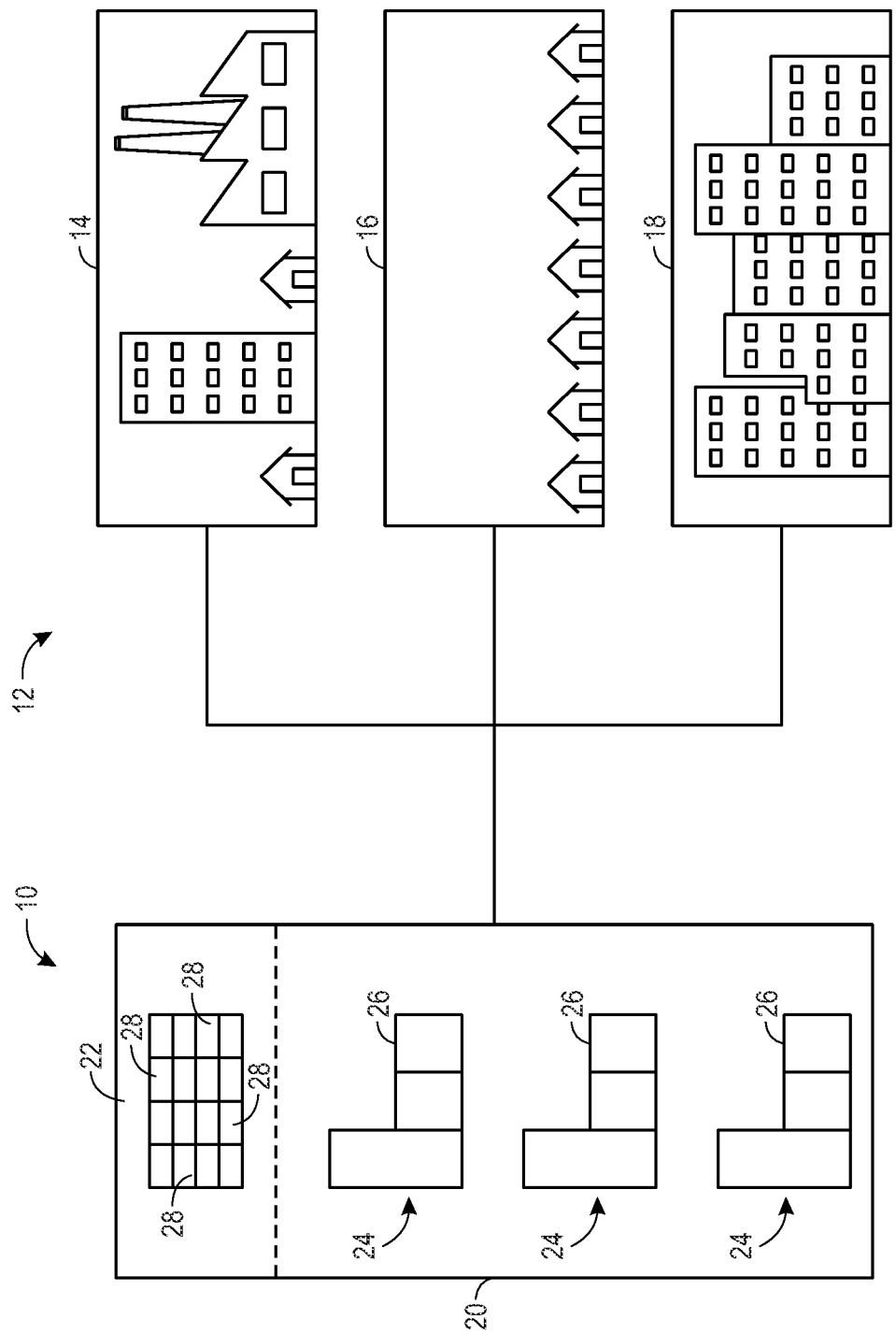
FIG. 1 is a schematic of a hybrid power plant coupled to various sections of a power grid, according to an embodiment of the disclosure.

FIG. 1 is a schematic of a hybrid power plant 10 coupled to various sections of a power grid 12. The power grid sections are labeled with the numbers 14, 16, and 18. The hybrid power plant 10 includes a power plant 20 and a battery energy storage system (BESS) 22. The power plant 20 may include a plurality of power drives 24 (e.g., gas turbines, steam turbines, reciprocating engines) that couple to electrical generators 26. In operation, the power drives 24 rotate in response to the energy conversion (e.g., oil, syngas, steam). The combustion of the fuel may occur within the power drives 24 (e.g., gas turbines, reciprocating engines), or the power drives 24 may receive a steam flow created by the combustion of fuel, steam generator, and/or nuclear reactor.

The electrical energy created by the generators 26 is then transferred through transmission lines to sections (e.g., sections 14, 16, and 18) of the power grid 12. The power from the generators 26 may also be transferred to the BESS 22, which stores the electrical energy as chemical energy within banks of batteries 28. The energy in the BESS 22 may be released to the grid 12, as needed to supplement power produced by the power plant 20. For example, the power from the BESS 22 may be released during times of peak electricity usage. Power from the BESS 22 may also be released to satisfy unexpected demand. In addition to supplementing the power produced by the power plant 20, the BESS 22 enables black grid restoration.

As explained above, black grid restoration is the restoring of power to the power grid 12 after a blackout. Power is restored to the grid 12 after a blackout, in measured steps to stabilize the grid 12 as power production increases by one or more power plants. For example, one neighborhood may receive power, followed by another neighborhood, a factory, city block, and so on. Restoring power to these various sections of the grid 12 is referred to as load steps because, as soon as a section of the grid is energized, the simultaneous draw of power from electrical devices in that section creates a step change in power usage. For example, the load (i.e., the combined load of various electrical devices) from a first section of the grid (e.g., section 14) may draw 25 MW. As soon as a second section of the grid (e.g., section 16 or section 18) is energized, the combined power draw may jump from 25 MW to 45 MW or any other value demanded by the grid and sized for the solution capacity as the electricity-using devices in the second section immediately begin using power.

The embodiments described herein include a hybrid power plant 10 that enables black grid restoration with large load step changes using the BESS 22. Therefore, the grid 12 may be restored more rapidly and with flexible load steps. The hybrid power plants 10 described below may also reduce a dynamic response from the power plant 20 portion of the hybrid power plant 10. In other words, the power plant 20 may not be required to rapidly increase power output in response to energizing sections of the grid 12. This may reduce stress and lifetime consumption on components of the power plant 20, such as its gas turbines.

Figure 2:
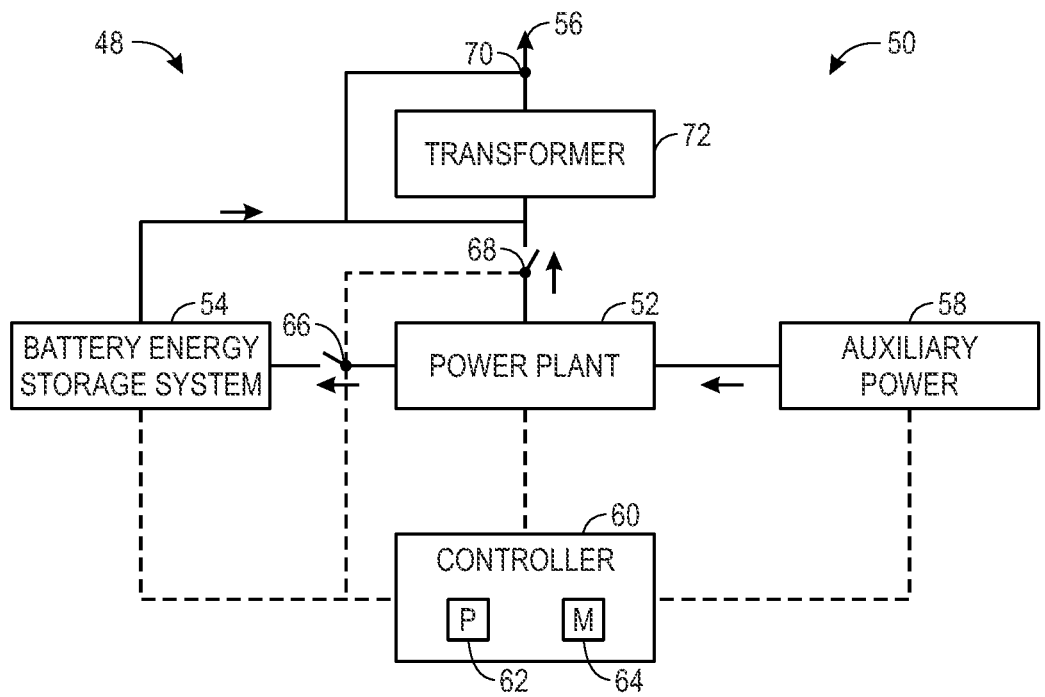
FIG. 2 is a schematic of a power grid restoration system configured to black start a power grid, according to a first aspect of the disclosure.

FIG. 2 is a schematic of a power grid restoration system 48 that includes a hybrid power plant 50 that restores power to a black grid, according to one aspect of the present disclosure. The hybrid power plant 50 includes a power plant 52 that couples to a battery energy storage system (BESS) 54. The BESS 54 includes batteries that receive and store electrical energy produced by the power plant 52 as chemical energy. As explained above, during black grid restoration, the power plant 52 may not receive power from the grid 56 during startup. More specifically, the power plant 52 may not receive power through the transmission lines that couple the power plant 52 to the grid 56. Instead, the hybrid power plant 50 may include an auxiliary power source 58 (e.g., gas or diesel generator or turbine) that provides power to the house loads of the power plant 52 during start-up. The power plant 52 uses power from the auxiliary power source 58 to power equipment of the power plant 52 that is required for start-up and operation of the power plant 52 until the power plant 52 produces enough power to power its house loads (e.g., pumps, valves, control systems) or even until end of the grid restoration. Once the power plant 52 is operational, the hybrid power plant 50 can start restoring power to the black grid in steps (i.e., by restoring sections of the grid, in turn).

In order to control the process of black grid restoration, the hybrid power plant 50 includes a controller 60. The controller 60 includes a processor 62 and a memory 64. For example, the processor 62 may be a microprocessor that executes software to control operation of the power plant 52, the BESS 54, and the auxiliary power source 58. The processor 62 may include multiple microprocessors, one or more "general-purpose" microprocessors, one or more special-purpose microprocessors, and/or one or more application specific integrated circuits (ASICs), field-programmable gate arrays (FPGAs), or some combination thereof. For example, the processor 62 may include one or more reduced instruction set (RISC) processors.

The memory 64 may include a volatile memory, such as random access memory (RAM), and/or a nonvolatile memory, such as read-only memory (ROM). The memory 64 may store a variety of information and may be used for various purposes. For example, the memory 64 may store processor executable instructions, such as firmware or software, for the processor 62 to execute. The memory 64 may include ROM, flash memory, a hard drive, or any other suitable optical, magnetic, or solid-state storage medium, or a combination thereof. The memory 64 may store data, instructions, and any other suitable data.

After starting the power plant 52, the controller 60 ramps up power production by the power plant 52, if needed to charge the BESS 54. It should be understood that the discussion of opening and closing switches is to facilitate an understanding of the flow of power and not necessarily how the flow of power may actually be controlled. In order to charge the BESS 54, a switch 66 is closed to enable power to flow from the power plant 52 to the BESS 54. After charging the BESS 54, the controller 60 may open the switch 66 while closing the switch 68. Closing the switch 68 enables the release of power from the power plant 52 to the grid 56. While closing the switch 68, the controller 60 simultaneously releases power from the BESS 54 to the grid 56. The combined release of power from the BESS 54 and the power plant 52 is a first block load (e.g., block of power).

For example, the power plant 52 may release 20 MW and the BESS 54 may release 25 MW of power for a combined power output of 45 MW. The 45 MW reenergizes a section of the grid 56 (e.g., section 14, 16, 18 in FIG. 1). The controller 60 then reduces power output by the BESS 54, while simultaneously increasing power output by the power plant 52.

Continuing with the example above, the controller 60 reduces power output of the BESS 54 from 25 MW to 0 MW while simultaneously increasing power production by the power plant from 20 MW to 45 MW. In this way, the power plant 52 may gradually increase power production while reducing and/or blocking the dynamic loading (e.g., rapid increases in power production) of the power plant 52. It should be understood that the power output by the BESS 54 and/or the power plant 52 may be greater than or less than the exemplary power outputs described, depending on the capacity/sizing of hybrid power plant 50 and power demand of the grid.

After matching the first block of power or load, the controller 60 again releases power from the BESS 54. The second block of power may include 45 MW from the power plant 52 and 25 MW from the BESS 54 for a combined power release of 70 MW. The release of this second block of power reenergizes a second section of the grid, in addition to maintaining power to the first section. The controller 60 then reduces power output by the BESS 54 while simultaneously increasing power output by the power plant 52. That is, power production by the BESS 54 is reduced from 25 MW to 0 MW while simultaneously increasing power production by the power plant from 45 MW to 70 MW. In this way, the controller 60 may continue to release block loads of power from the hybrid power plant 50 to the grid 56 to restore power to additional grid sections (e.g., 1, 2, 3, 4, 5, 10, or more sections).

In some embodiments, the block load of power may also include a power jump provided by the power plant 52 that is in addition to the power jump provided by the BESS 54. For example, the power plant may release a first block load of power with 20 MW from the power plant 52 and 25 MW from the BESS 54 for a combine power output of 45 MW. The 45 MW reenergizes a section(s) of the grid 56 (e.g., section 14, 16, 18 in FIG. 1). The controller 60 then reduces power output by the BESS 54 while simultaneously increasing power output by the power plant 52.

After matching the first block of power or load (i.e., 45 MW), the controller 60 again releases power from the BESS 54 while also providing an additional power jump from the power plant 52. For example, the BESS 54 again releases 25 MW of power, while the power plant 52 releases 60 MW (i.e., 45 MW equaling the first block load, plus a 15-MW power jump). Thus, the second block of power delivers a combined 85 MW to the grid 56. The release of this second block of power reenergizes one or more additional sections of the grid in addition to maintaining power to the first section.

The controller 60 then reduces power output by the BESS 54 while simultaneously increasing power output by the power plant 52. That is, power production by the BESS 54 is reduced from 25 MW to 0 MW, while simultaneously increasing power production by the power plant 52 from 60 MW to 85 MW. In this way, the controller 60 may continue to release block loads of power from the hybrid power plant 50 to the grid 56 to restore power to additional grid sections (e.g., 1, 2, 3, 4, 5, 10, or more sections).

As the hybrid power plant 50 block loads the power grid 56, the release of power from the BESS 54 may exhaust the batteries of the BESS 54. Accordingly, between each release of power by the BESS 54 or after multiple releases, the controller 60 may close the switch 66 and increase power production by the power plant 52 to recharge the batteries of the BESS 54. After recharging the BESS 54, the process of releasing block loads of power may continue.

As illustrated, the power plant 52 and the BESS 54 are behind/upstream from the same point of interconnect 70 to the grid 56. By placing the power plant 52 and the BESS 54 behind/upstream from the same point of interconnect 70, the power released by the power plant 52 and the BESS 54 flow through the same transformer 72 (e.g., set of transformers). In other words, the hybrid power plant 50 may not include duplicate components (e.g., transformers) for the power plant 52 and for the BESS 54. In some embodiments, power from the BESS 54 may not flow through transformer 72, but rather the BESS 54 may connect to the high-side of the transformer 72, where it then flows through the point of interconnect 70.

Figure 3:
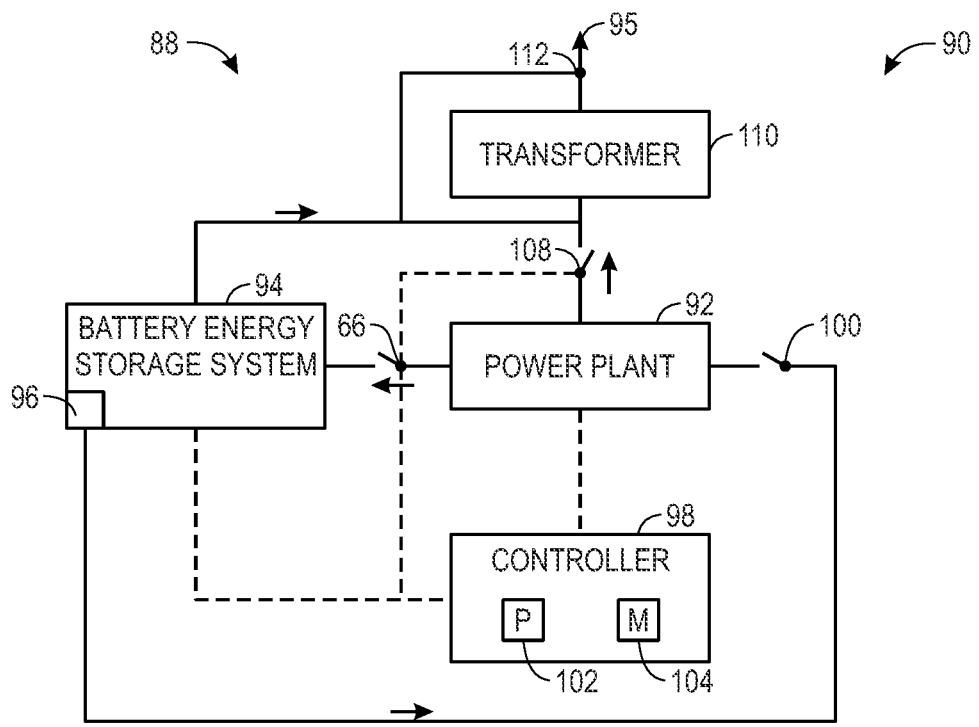
FIG. 3 is a schematic of a power grid restoration system configured to black start a power grid, according to a second aspect of the disclosure.

FIG. 3 is a schematic of a power grid restoration system 88 that includes a hybrid power plant 90 that restores power to a black grid, according to a second aspect of the present disclosure. The hybrid power plant 90 includes a power plant 92 that couples to a battery energy storage system (BESS) 94. The BESS 94 includes batteries that receive and store electrical energy produced by the energy plant 92 as chemical energy. As explained above, during black grid restoration the power plant 92 may not receive power from the grid 95 during startup. The hybrid power plant 90 therefore uses a different source of power during startup. In FIG. 3, the hybrid power plant 90 uses the BESS 94 to provide power to the house loads of the power plant 92 during start-up.

During normal operation of the hybrid power plant 90, the power plant 92 charges the BESS 94. The BESS 94 or a portion thereof may therefore contain sufficient power to start the equipment of the power plant 92 required for operation and start-up until the power plant 92 provides sufficient power to power itself. In some embodiments, a portion 96 of the BESS 94 may be dedicated to the restart of the power plant 92 or supply of house loads. The charge in this portion 96 (e.g., the batteries in this portion 96) may be continuously maintained during operation of the hybrid power plant 90 in order to restart the power plant 92 in the event of a black grid restoration or black start. In still other embodiments, different portions (e.g., batteries) of the BESS 94 may alternate as the dedicated portion 96 for storing power for restarting the power plant 92 and respective house loads. Alternating the portion of the BESS 94 dedicated to restarting the power plant 92 may enable equal wear of the batteries in the BESS 94.

During black grid restoration, the controller 98 closes a switch 100 and releases power from the BESS 94 (e.g., portion 96) to the power plant 92. The power plant 92 uses this energy to start various pieces of equipment required for start-up and operation of the power plant. The power plant 92 continues to use this power until the power plant 92 produces enough power to power itself or until grid restoration.

The controller 98 includes a processor 102 and a memory 104. The memory 104 may store a variety of information and may be used for various purposes. For example, the memory 64 may store processor executable instructions, such as firmware or software, for the processor 102 to execute for controlling the hybrid power plant 90 (e.g., during black grid restoration).

As explained above, after starting the power plant 92, the controller 98 ramps up power production by the power plant 92 and closes the switch 66 in order to charge the BESS 94. After charging the BESS 94, the controller 98 may open the switch 66 while closing the switch 108. Closing the switch 108 enables the release of power from the power plant 92 to the grid 95. While closing the switch 108, the controller 98 simultaneously releases power from the BESS 94 to the grid 95 as a combined first block of power or load. The controller 98 then reduces power output by the BESS 94 while simultaneously increasing power output by the power plant 92 to compensate for the change in power output by the BESS 94. As explained above, it should be understood that the discussion of opening and closing switches is to facilitate an understanding of the flow of power and not necessarily how the flow of power may actually be controlled.

After matching the first block of power, the controller 98 again releases power from the BESS 94. The release of this second block of power reenergizes a second section of the grid while the power plant 92 maintains power to the first section. The controller 98 then again reduces power output by the BESS 94 while simultaneously increasing power output by the power plant 92. In this way, the controller 98 may continue to release block loads of power from the hybrid power plant 90 to the grid 95 to restore power to additional grid sections (e.g., 1, 2, 3, 4, 5, 10, or more sections).

As the hybrid power plant 90 block loads the power grid 95, the release of power from the BESS 94 may exhaust the batteries of the BESS 94. Accordingly, between each block load of the grid 95 or after multiple block loadings, the controller 98 may close the switch 66 and increase power production by the power plant 92 to recharge the batteries of the BESS 94. After recharging the BESS 94, the process of releasing block loads of power may continue. As the block loads of power are released, they flow through the transformer 110 and through the same point of intersect 112 with the grid 95. In some embodiments, power from the BESS 94 may not flow through transformer 110, but rather the BESS 94 may connect to the high-side of the transformer 110 from which the power flows through the point of intersect 112.

Figure 4:
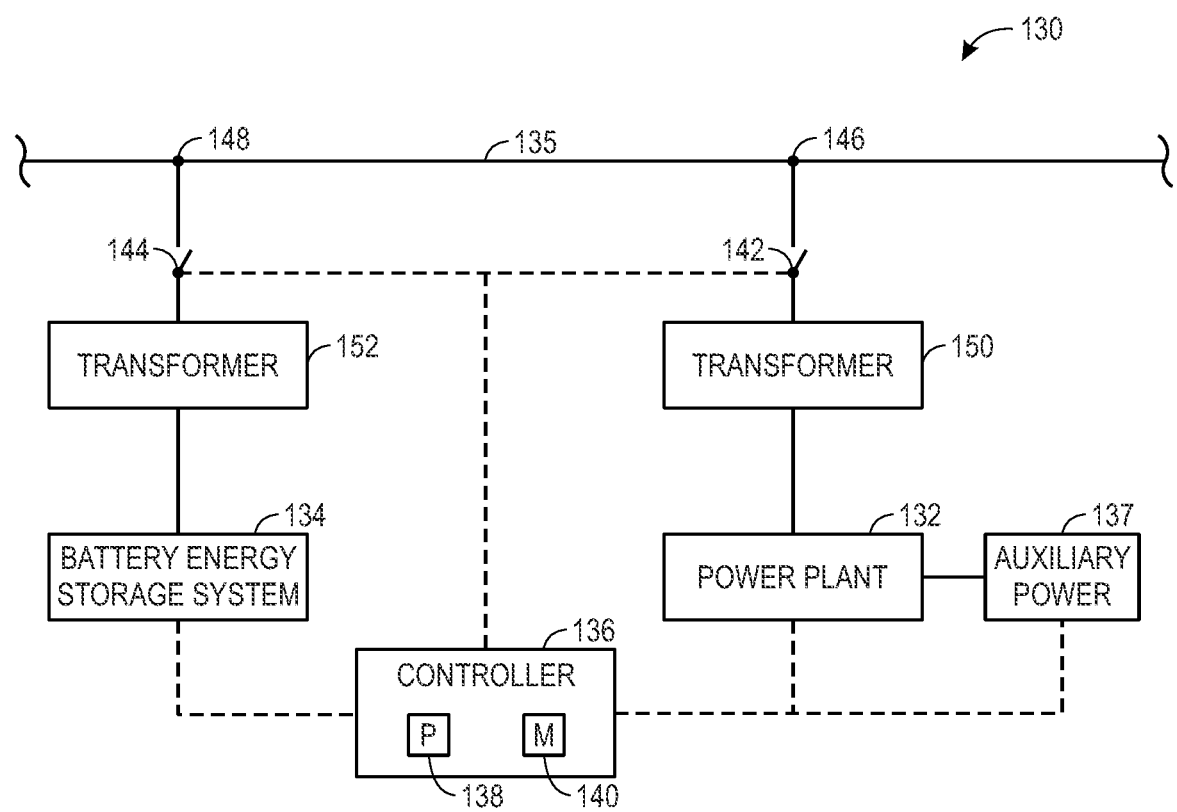
FIG. 4 is a schematic of a power grid restoration system configured to black start a power grid, according to a third aspect of the disclosure.

FIG. 4 is a schematic of a power grid restoration system 130 that includes a power plant 132 and a battery energy storage system 134 (BESS) that work together to restore power to a black grid, according to a third aspect of the present disclosure. As illustrated, the power plant 132 and the BESS 134 may have different points of intersection with the grid 135 (e.g., points of intersection 146 and 148, respectively) and may not be co-located. The power plant 132 and the BESS 134 may be separate systems coupled to the grid 135, and whose operation is coordinated by a controller 136 to restore power to a black grid.

As explained above, during black grid restoration, a power plant 132 may not receive power from the grid 135 during start-up. The power plant 132 may instead use an auxiliary power source 137 to power the equipment of the power plant required for start-up and operation of power plant 132 until the power plant 132 provides sufficient power to power itself or even until end of the grid restoration if deemed to be required.

The controller 136 may control power production by the auxiliary power source 137, as well as the start-up of the power plant 132. The controller 136 includes a processor 138 and a memory 140. The memory 140 may store a variety of information and may be used for various purposes. For example, the memory 140 may store processor executable instructions, such as firmware or software, for the processor 138 to execute for controlling the power plant 132, the auxiliary power source 137, as well as the BESS 134 (e.g., during black grid restoration).

As explained above, after starting the power plant 132, the controller 136 ramps up power production by the power plant 132. After ramping up power production, the controller 136 releases power from the power plant 132 to the grid 135. Simultaneous with the release of power from the power plant 132 via closed switch 142, the controller 136 closes the switch 144 to release power from the BESS 134. The combined power output from the power plant 132 and from the BESS 134 form a first block of power or load that enters the grid 135. The controller 136 then reduces power output by the BESS 134 while simultaneously increasing power output by the power plant 132 to compensate for the change in power output by the BESS 134. In this way, the power plant 132 may gradually increase power production while reducing and/or blocking the dynamic loading (e.g., rapid increases in power production) of the power plant 132.

After matching the first block of power, the controller 136 again releases power from the BESS 134. The release of this second block of power reenergizes a second section of the grid while the power plant 132 maintains power to the first section. The controller 136 then again reduces power output by the BESS 134 while simultaneously increasing power output by the power plant 132. The controller 136 continues to release block loads of power to the grid 135 until the additional grid sections are reenergized (e.g., 1, 2, 3, 4, 5, 10, or more sections) and power production is sustained by the power plant 132.

Over time, the release of power from the BESS 134 may exhaust the batteries of the BESS 134. Accordingly, the power plant 132 may increase power production which then flows through the grid 135 and recharges the batteries of the BESS 134. After recharging the BESS 134, the process of releasing block loads of power may continue.

As explained above, the power plant 132 and the BESS 134 may not be co-located and may have different points of intersection with the grid 135 (specifically, points of intersection 146, 148). The power grid restoration system 130 may include multiple transformers in order to increase the voltage of these power sources. As illustrated, the power grid restoration system 130 includes a transformer 150 that increases the voltage of the electricity released by the power plant 132 to the grid 135. Likewise, the power grid restoration system 130 includes a transformer 152 that increases the voltage of the electricity released by the BESS 134.

Figure 5:
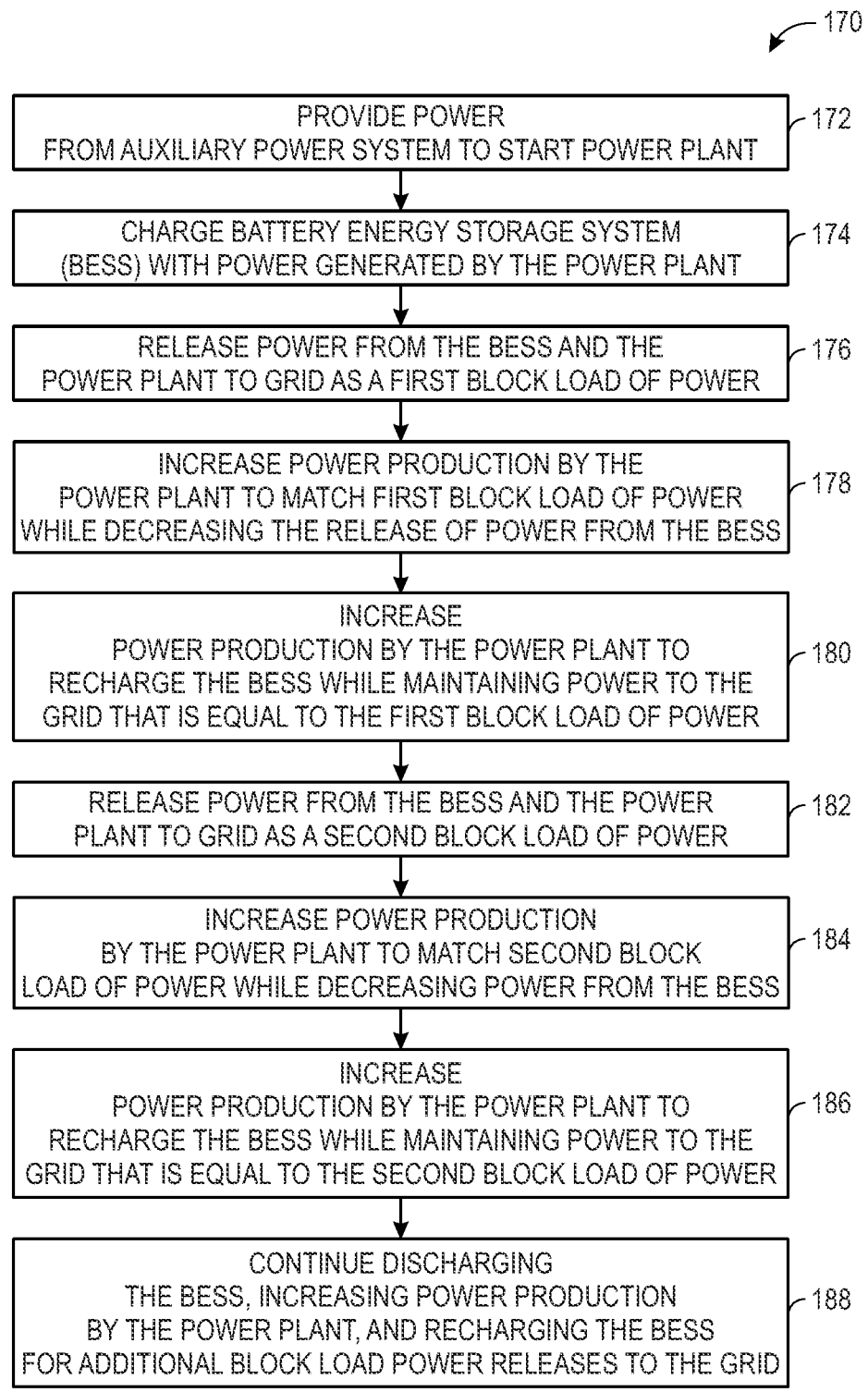
FIG. 5 is a first exemplary method of black starting a power grid, according to an embodiment of the disclosure.

FIG. 5 is a first exemplary method 170 of restoring power to a black grid, according to one aspect of the present disclosure. The method 170 begins by providing power from an auxiliary power system to start the power plant, step 172. That is, the auxiliary power system may provide power to the power plant house loads as well as starting one or more power plant turbines and generators. The auxiliary power system may be a gas generator, diesel generator, batteries (e.g., a battery energy storage system). The power plant may include one or more gas turbines and/or steam turbines that couple to generators that convert the mechanical energy of the turbines into electrical energy.

In some embodiments, after starting the power plant, the power generated by the power plant is used to charge a battery energy storage system (BESS), step 174. For example, the BESS may have been previously depleted and may need to be recharged before providing power to the grid.

After charging the BESS, the combined power from the power plant and the BESS is released to the grid as a first block load of power, step 176. This first block load of power energizes a portion or section of the grid.

Power production by the power plant is then increased to match the first block load while simultaneously decreasing the power output of the BESS, step 178. For example, the first block load may include 15 MW from the power plant and 25 MW from the BESS for a combined output of 40 MW. During the transition, power production by the BESS decreases to zero as power production by the power plant increases to 40 MW.

Power production by the power plant may then increase above the first block load in order to maintain power to the grid while simultaneously recharging the BESS (e.g., recharge BESS if needed) in preparation for the release of a second block load of power, step 180. For example, the power plant output may increase to 50 MW.

After charging the BESS, the power from the BESS is released to the grid and combines with the power from the power plant to form a second block load of power, step 182.

Power production by the power plant is then increased to match the second block load while simultaneously decreasing the power output of the BESS, step 184. For example, the second block load may include 50 MW from the power plant and 25 MW from the BESS for a combined output of 75 MW. During the transition, power production by the BESS decreases to zero as power production by the power plant increases to 75 MW.

Power production by the power plant may then increase above the second block load in order to maintain power to the grid while simultaneously recharging the BESS (e.g., recharge BESS if needed) in preparation for the release of another block load of power, step 186. For example, the power plant output may increase to 85 MW.

This process of releasing block loads of power by charging and discharging the BESS while increasing power production by the power plant continues (step 188) until the black grid is restored.

Figure 6:
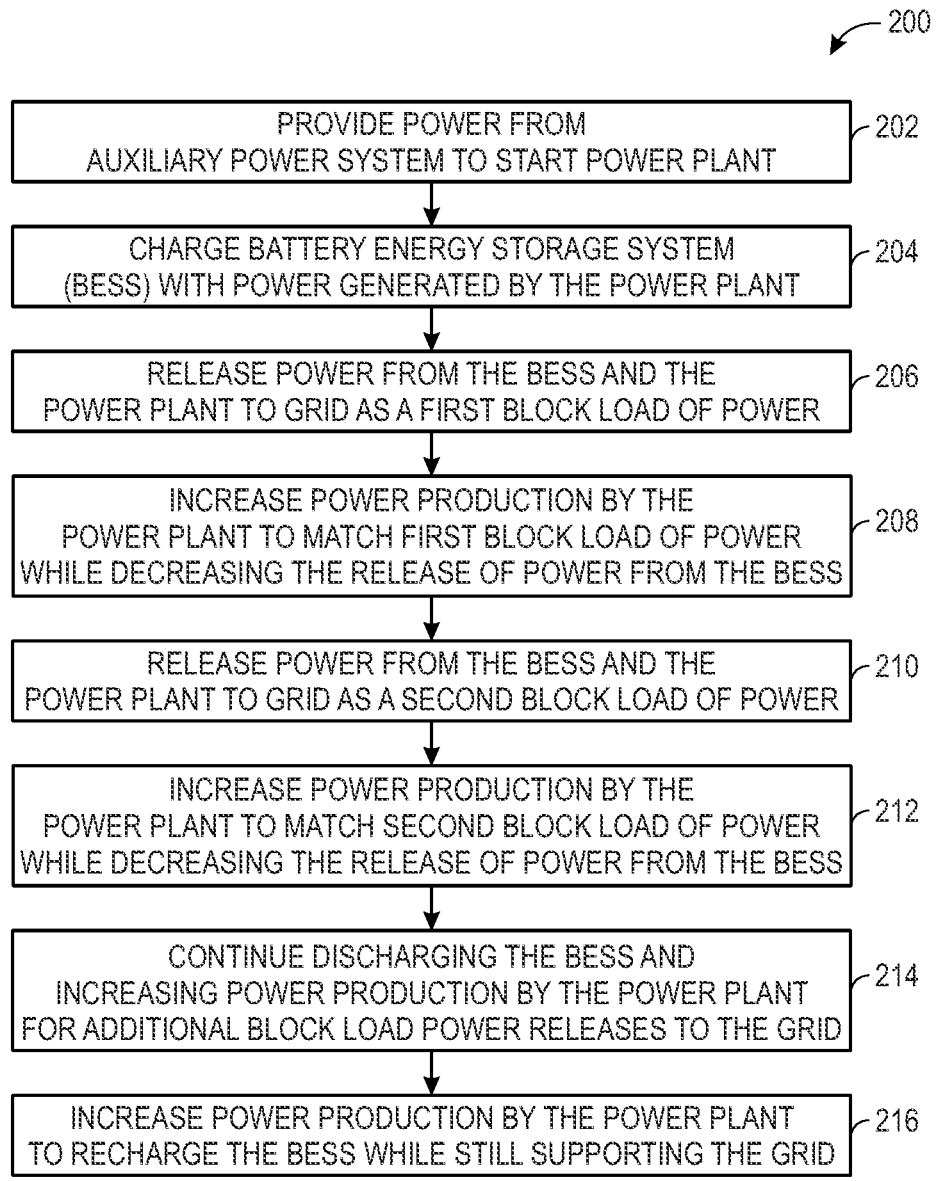
FIG. 6 is a second exemplary method of black starting a power grid, according to another embodiment of the disclosure.

FIG. 6 is a second exemplary method 200 of restoring power to a black grid, according to another aspect of the present disclosure. The method 200 begins by providing power from an auxiliary power system to start the power plant, step 202. That is, the auxiliary power system may provide power to the power plant house loads as well as starting one or more power plant turbines and generators. The auxiliary power system may be a gas generator, diesel generator, or batteries (e.g., a battery energy storage system). The power plant may include one or more gas turbines and/or steam turbines that couple to generators that convert the mechanical energy of the turbines into electrical energy.

In some embodiments, after starting the power plant, the power generated by the power plant is used to charge a battery energy storage system (BESS), step 204. For example, the BESS may be the auxiliary power system used to start the power plant, or the BESS may have been previously depleted and may need to be recharged before block loading the power grid.

After charging the BESS, the combined power from the power plant and the BESS is released to the grid as a first block load of power, step 206. This first block load of power energizes a portion or section of the grid.

Power production by the power plant is then increased to match the first block load while simultaneously decreasing the power output of the BESS, step 208. For example, the first block load may include 25 MW from the power plant and 25 MW from the BESS for a combined output of 50 MW. During the transition, power production by the BESS decreases to zero as power production by the power plant increases to 50 MW.

After increasing power production by the power plant, power from the BESS is again released to the grid and combines with the power from the power plant to form a second block load of power, step 210.

Power production by the power plant is then increased to match the second block load while simultaneously decreasing the power output of the BESS, step 212. For example, the second block load may include 50 MW from the power plant and 25 MW from the BESS for a combined output of 75 MW. During the transition, power production by the BESS decreases to zero as power production by the power plant increases to 75 MW.

The method 200 may continue this process of discharging power from the BESS in block loads while increasing power production until the grid is restored, step 214.

Over time, the continual discharge of the BESS may exhaust the energy stored. The power plant may therefore increase power production to recharge the BESS while still supporting power production for the grid, step 216.

Technical effects of the present hybrid power plant enable black starting a power plant and a grid with large load steps. The grid may therefore be restored more rapidly and without dynamically loading the power plant portion of the hybrid power plant, which may reduce stress and lifetime consumption on components of the power plant, such as its gas turbines.

This written description uses examples to disclose the present power grid restoration systems and methods, including the best mode, and also to enable any person skilled in the art to practice the systems and methods, including making and using any devices or systems and performing any incorporated methods. The patentable scope of the technology is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A power grid restoration system, comprising:
 a hybrid power plant configured to provide electrical power to a power grid, the hybrid power plant comprising:
  a power plant configured to generate electrical power with a power drive;
  a battery energy storage system configured to receive and store electrical power from the power plant, wherein the battery energy storage system is configured to release the electrical power during block loading of the power grid; and
  a controller coupled to the power plant and to the battery energy storage system, wherein the controller is configured to control charging of the battery energy storage system with the power plant and to control the release of a first block load of electrical power from the battery energy storage system and the power plant while block loading the power grid during a black grid restoration.

2. The system of claim 1, wherein the power plant maintains a constant level of power production during the release of the first block load of the electrical power to the power grid.

3. The system of claim 1, wherein the controller is configured to increase power production by the power plant to a first load that is substantially equal to the first block load while simultaneously reducing the release of electrical power from the battery energy storage system.

4. The system of claim 3, wherein the controller is configured to increase power production by the power plant to a second load to recharge the battery energy storage system.

5. The system of claim 4, wherein the controller is configured to release a second block load of electrical power from the battery energy storage system and the power plant, wherein the second block load is greater than the first block load.

6. The system of claim 1, wherein the power drive comprises a gas turbine and/or a steam turbine.

7. The system of claim 1, wherein the power drive comprises a reciprocating engine.

8. The system of claim 1, comprising an auxiliary power source configured to start house loads of the power plant during the black grid restoration, wherein the controller is configured to control the release of power from the auxiliary power source to the power plant.

9. The system of claim 8, wherein the auxiliary power source is the battery energy storage system.

10. The system of claim 1, wherein the power plant and the battery energy storage system deliver electrical power through the same point of interconnect to the power grid.

11. A method of black grid restoration with a hybrid power plant, the method comprising:
   starting a power plant of the hybrid power plant;
   charging a battery energy storage system of the hybrid power plant with electrical power from the power plant; and
   releasing a first block load of electrical power from the power plant and the battery energy storage system to a power grid to restore power to a portion of a black grid.

12. The method of claim 11, comprising increasing power production by the power plant to a first load that is substantially equal to the first block load.

13. The method of claim 12, comprising reducing the release of electrical power from the battery energy storage system while increasing power production by the power plant to the first load.

14. The method of claim 13, comprising releasing a second block load of electrical power from the power plant and the battery energy storage system.

15. The method of claim 14, comprising increasing power production by the power plant to a second load that is substantially equal to the second block load.

16. The method of claim 15, comprising reducing the release of electrical power from the battery energy storage system while increasing power production by the power plant to the second load.

17. A system comprising:
   a controller configured to couple to a power plant and to a battery energy storage system of a hybrid power plant, wherein the controller is configured to control charging of the battery energy storage system with the power plant and to control the release of a first block load of electrical power from the battery energy storage system and the power plant while block loading a power grid during a black grid restoration.

18. The system of claim 17, wherein the controller is configured to increase power production by the power plant to a first load that is substantially equal to the first block load while simultaneously reducing the release of electrical power from the battery energy storage system.

19. The system of claim 18, wherein the controller is configured to increase power production by the power plant to a second load.

20. The system of claim 19, wherein the controller is configured to release a second block load of electrical power from the battery energy storage system and the power plant while block loading the power grid during the black grid restoration, wherein the second block load is greater than the first block load.

\* \* \* \* \*